June 23, 1970  M. R. HICKS ET AL  3,516,439
LOW FLUID PRESSURE ACTUATED FLUID JET INTERRUPTER MEANS Filed Aug. 24, 1967   2 Sheets-Sheet 1

INVENTORS
MORRIS R. HICKS &
JOSEPH C. LEVEQUE
BY
ATTORNEY

INVENTOR.
MORRIS R. HICKS &
JOSEPH C. LEVEQUE
BY
ATTORNEY

United States Patent Office 3,516,439
Patented June 23, 1970

3,516,439
LOW FLUID PRESSURE ACTUATED FLUID JET INTERRUPTER MEANS
Morris R. Hicks, Brook Park, and Joseph C. Le Veque, Cleveland, Ohio, assignors to Bardons & Oliver, Inc., Cleveland, Ohio, a corporation of Ohio
Filed Aug. 24, 1967, Ser. No. 663,036
Int. Cl. F15c 3/14
U.S. Cl. 137—610     11 Claims

ABSTRACT OF THE DISCLOSURE

A fluidic jet interrupter device wherein the flow of a fluid stream of substantially constant pressure between axially aligned and spaced apart inlet and outlet conduits is responsive to a controlled very low pressure input signal of the order of about 2" water column, or less, to selectively delay, disrupt, block, or restore the fluid jet stream between the spaced apart inlet and outlet conduits, whereby the device may be utilized as a time delay means controlling the movement of selected members of an organized machine or the like, or be utilized as a fluid relay for normally "open," or normally "closed" operation.

SUMMARY OF THE INVENTION

The fluidic jet interrupter of this invention provides means by which the flow of a fluid such as air at substantially constant pressure, either in laminar or turbulent form, across a gap separating an inlet conduit and an axially aligned outlet conduit, may be selectively interrupted by a very low pressure input fluidic signal of 2" water column or less to disrupt, delay, block or to restore the flow of the constant stream in response to the action of the low pressure signal directed into the path of the constant pressure stream.

This invention, as embodied in a relay role, is particularly well suited to uses in control systems such as those governing the performance of mechanisms in accordance with a selected program, for instance, in the timing and coordination of such mechanisms in performing one or more cycles of operation, i.e. machine tools.

The present invention will eliminate faulty operation of the device when used as a relay due to the elimination of sliding or rotating mechanical parts actuated by a control low pressure input signal since, due to even slight changes in friction resulting from foreign particles in the control fluid supply or in the atmosphere could be sufficient to cause failure of the limited energy available at the control signal input.

Back pressure type relay devices in which fluid is metered into a chamber through a very small orifice and allowed to escape to atmosphere through a larger orifice, are subject to blocking by foreign matter in the fluid supply and thus can build up a pressure rise in the chamber. Such devices also require sufficient control input energy to seal an orifice which is difficult to do reliably at such low energy levels.

The invention disclosed herein may also be employed as a time delay device wherein a very low fluid pressure input signal is employed to actuate an interrupter and project it toward an adjustable stop to block the path of a constant pressure fluid jet traversing a gap between an inlet conduit and an axially aligned output conduit. In this use, the device may be used as a "normally open timed open delay" or by modifying the shape of the interrupter, it may be used as a "normally closed time closed delay."

In use, as embodied either in a relay device or in a time delay unit, it will be observed that a substantially constant pressure fluid jet, whether of turbulent or laminar form, is directed through an input conduit, across a gap, to an axially aligned output conduit for delivery to a mechanism to be actuated. A very low pressure fluid input signal of the order of 2" water column, or less, will actuate or effect the movement of an interrupter means into, across or out of the path of the constant pressure fluid jet to provide simple, effective and selective control of the constant pressure jet stream, such control will disrupt, block, delay or restore the output signal thereof, and thereby effectively control the function of such mechanisms as are connected with the said output signal. For instance, many functions in machine tool operation, such as slide traverse, feed or return, turret indexing, etc. may readily be controlled by this simple means.

THE DRAWINGS

Figure 1:
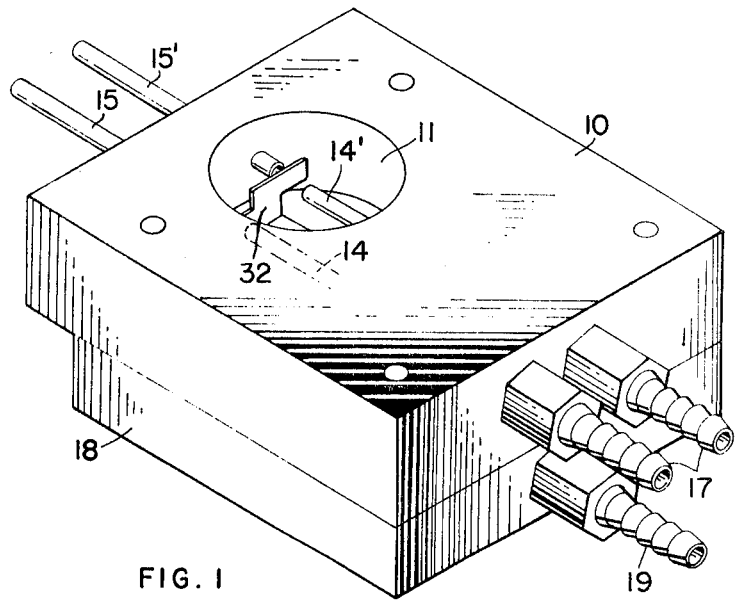
FIG. 1 is a perspective view of an embodiment of the invention employed as a fluid relay of the fluid jet type.
Figure 2:
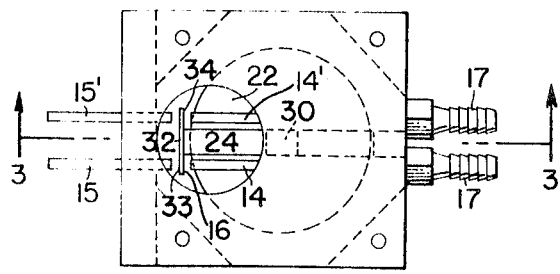
FIG. 2 is a top plan view of the device shown in FIG. 1.
Figure 4:
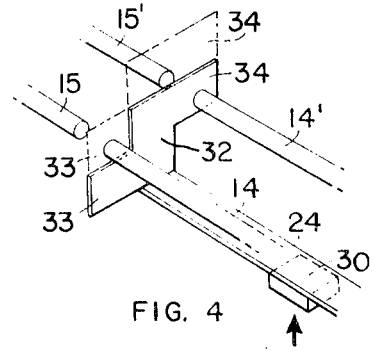
FIG. 4 is a perspective view taken in the direction of line 4—4 of FIG. 3.

Referring now first to FIGS. 1 through 4, the embodiment illustrated therein is particularly useful as a fluid relay means which may consist of one or more independent substantially constant fluid pressure systems. Each system includes an input conduit and an axially aligned output conduit spaced apart within a chamber to provide a gap therebetween along the common axis. An interrupter responsive to an input fluid signal of low energy moves selectively into and out of the axial flow path of at least one of the pressure systems or, if desired may alternately block one system while being ineffective to block another of the systems.

The relay unit is mounted in a housing consisting of an upper body section 10 having a fluid jet chamber 11 formed therein with axially aligned input and output bores 12 and 13, respectively, in either single or multiple groups, each opening into the chamber. Input and output tubes 14 and 15 are secured in the bores and project axially into the chamber, their adjacent ends respectively being spaced apart a short distance to provide a gap 16 across which a substantially constant pressure fluid jet of air or other fluid is normally directed. A fitting 17 is provided for connection with a source of constant fluid pressure. Fluid pressure delivered from the tube 14 across the gap is received by the tube 15 and becomes an output which may be interrupted by suitable means, as will presently appear.

The lower body section 18 of the unit is provided with an input fitting 19 for connection with a low pressure fluid signal source and has a passage 20 leading from the fitting to an expansion chamber 21 which is open at its upper portion and underlies a flexible, expandable diaphragm 22 secured between the body sections 10 and 18 by screws 23.

Figure 3:
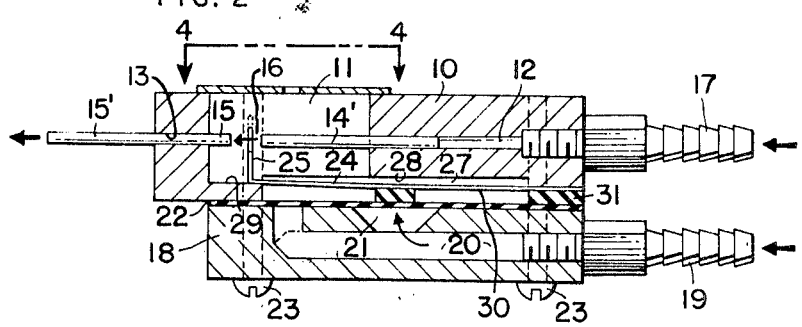
FIG. 3 is a section slightly enlarged and taken on line 3—3 of FIG. 2.

An interrupter member or gate of resilient material consists of an arm 24 anchored at one end between the sections 10 and 18 and terminates at its opposite end in an upturned gate portion 25. The bottom of the upper section 10 is undercut, as at 28, so that when the sections 10 and 18 are assembled, a clearance area 27 for limited flexing movement of the interrupter member about a fulcrum in the vicinity of the anchored end of the arm 24, is provided. Upward movement of the arm and the gate is limited by the undersurface 28 of the section 10 adjacent a wall defining the chamber 11, while return movement of the arm is limited by the flange portion 29, as shown in FIG. 3. Spacers 30 and 31, the former being carried by the undersurface of the arm at a point above and in substantial alignment with the vertical axis of the expansion chamber, and the latter being in contact with and disposed between adjacent peripheral portions of the sections 10 and 18, are provided to support the interrupter arm, as shown, for movement in the clearance area 27.

As viewed in FIG. 1, the upturned gate portion 25 of the arm 24 consists of a centrally located upright portion 32 and oppositely disposed horizontal flat surface wing areas 33 and 34 extending outwardly in substantially parallel planes such that when there is no signal pressure present and the diaphragm is in the position shown in FIG. 3, the wing 33 will not be disposed in the fluid gap between the input tube 14 and the output tube 15. Under such conditions, the constant fluid pressure stream between 14 and 15 is not interrupted. However, a low fluid pressure signal delivered to the diaphragm will cause the arm to flex upwardly sufficiently to place the wing 33 directly in the path of the fluid jet flow across the gap from the input 14 to the output 15 to cause a disruption of the constant pressure flow and consequently close the output 15.

The invention also takes into consideration the provision of a plurality of aligned constant pressure fluid jets, as already illustrated, whereby separate fluid pressure outputs may be controlled by a single low pressure input signal, as, for instance, alternately opening and closing a plurality of constant pressure outputs simultaneously or in progressive order.

The invention also contemplates a construction much the same as that illustrated in FIGS. 1 through 4 but which includes additional axially aligned and spaced fluid input and output passages, along with a modified form of gate or gates actuated by supplemental diaphragm devices. The gate or gates may be so shaped as to effect an overriding "OFF" function by normally blocking both air streams until a supplemental diaphragm is actuated independently of the first diaphragm by a supplemental input low pressure signal. While the above modified form is not illustrated fully in the drawings, it is within the intended scope of the invention.

Where there is provided a plurality of aligned constant pressure input and output tubes, as indicated in the figures, as at 14' and 15 (in addition to 14 and 15, respectively), the wing 34 is normally positioned to interrupt the flow of constant fluid pressure from 14' to input 15 in the absence of a low pressure fluid signal. When such a fluid signal is supplied to the diaphragm 22, the arm 24 is raised to bring the wing 33 between input 14 and output 15, thus interrupting the constant pressure flow therethrough. This results in raising the wing 34 out of the gap between the input 14' and output 15' to establish a constant pressure fluid flow therein substantially simultaneously with the blocking of flow to the output 15.

In FIGS. 5 to 8, inclusive, the invention is shown as a time delay means for effecting a selected time interruption. Such means being actuated by low fluid pressure input signal of an order of 2" water column, or less, whereby a constant pressure laminar jet stream of a fluid, such as air, may be interrupted as it passes from an input to an axially aligned output conduit across a gap therebetween.

The time delay means comprises a body 40 having a lower bore 41 and an axially aligned upper bore 42. Between these bores is an intermediate wall 43 having a bore 44 communicating with the bores 41 and 42. An end plate 45 is removably secured to the open bottom end of the bore 41. A fitting 46 is inserted in the end plate 45 to communicate the low pressure signal into the bottom wall of a bellows or other expandable member such as a chamber 47 which is secured at one end to the bottom plate 45. The bellows or expandable chamber 47 at its top end 48 is substantially flat and in contact with the head 49 of a plunger which is of sufficient weight to substantially collapse the bellows 47 when there is insufficient fluid pressure therein. A stem 50 is carried by the head 49 and projects upwardly through the bore 41 into bore 44 and is adapted to be projected up into bore 42 when a fluid pressure siganl is delivered to the bellows 47 to expand the same. A vent 51 is provided in the body 40 and communicates the bore 41 directly with atmospheric pressure. Another vent 52 communicates the bore 42 with atmospheric pressure.

Figure 8:
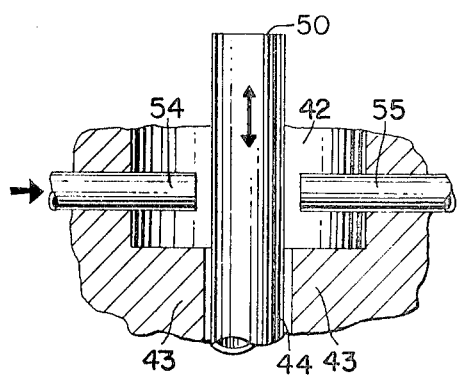
FIG. 8 is an enlarged detail taken in the direction of line 8—8 of FIG. 6.
Figure 5:
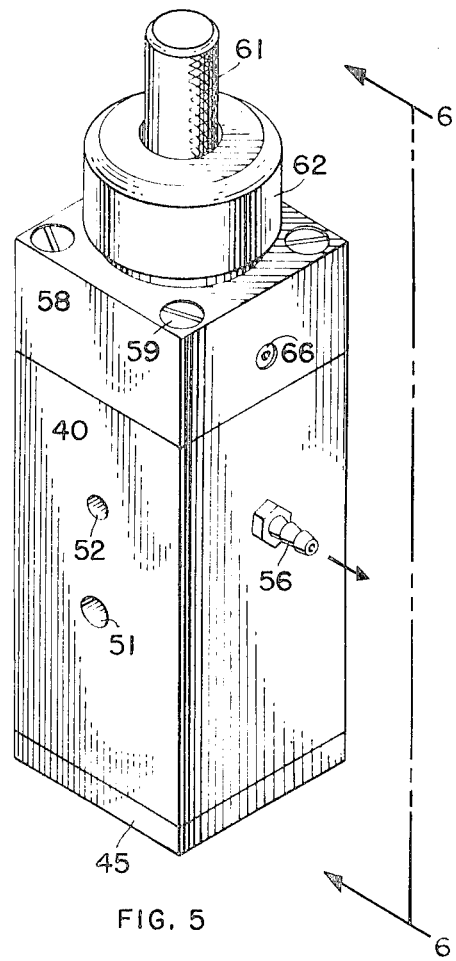
FIG. 5 is a perspective view of an embodiment of the invention employed as a fluid time delay of the fluid jet type.
Figure 6:
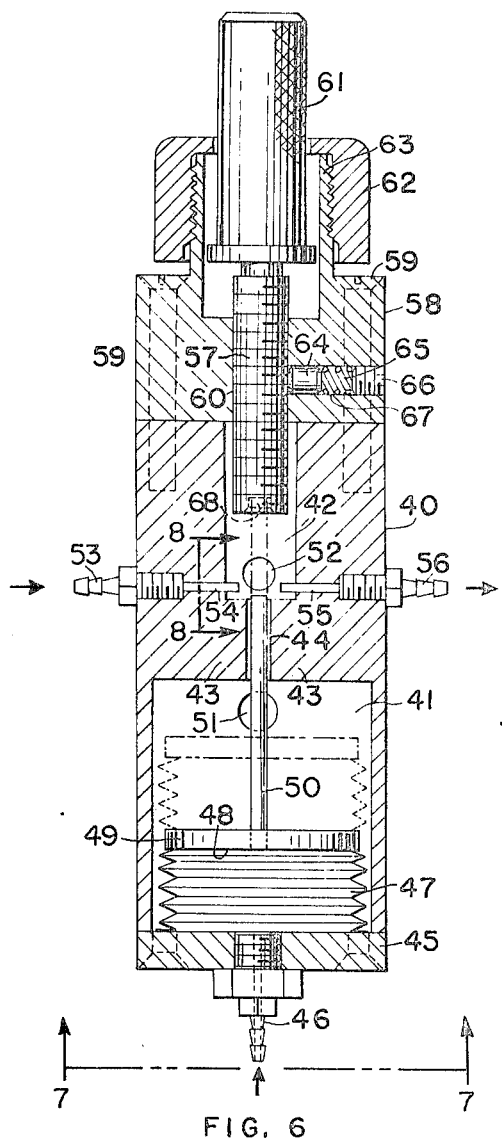
FIG. 6 is a vertical section taken on line 6—6 of FIG. 5.
Figure 7:
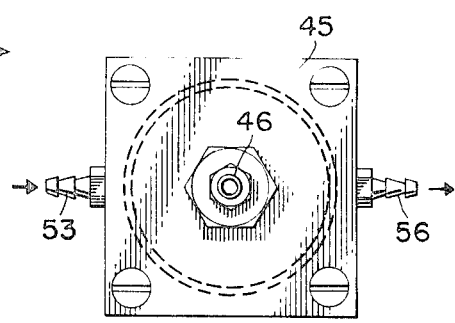
FIG. 7 is a bottom view taken on line 7—7 of FIG. 6.

As viewed in FIGS. 6 and 8, a fitting 53 is adapted for connection with the input side of a substantially constant pressure fluid source of an order higher than that of the input signal source. This fitting is removably secured to the body 40 and is arranged radially thereof and provided with an input tube 54 which projects into the bore 42 and in alignment with the adjacent end of a similar tube 55 carried by the output fitting 56 which is removably carried by the body 40. There is a gap between the aligned adjacent ends of the tubes 54 and 55 across which the stem 50 is adapted to be passed in response to a relatively low pressure fluid signal delivered to the interior of the bellows 47. As the stem 50 is projected upwardly across the gap between the adjacent ends of the tubes 554 and 55, it will interrupt the fluid jet crossing the gap and thereby prevents an output signal from being delivered from the output fitting 56 to mechanism or other means connected with the output of the jet.

Means is provided by which the extent of the upward movement of the stem 50 can be controlled, thus making it possible for selecting the time delay occurring between the interruption of the jet stream and its re-establishment. The re-establishment of the jet-stream is responsive to the fluid signal delivered to the bellows and the distance of downward travel of the stem 50 to its return position when the fluid signal is terminated.

This selective control means consists of a threaded member 57 carried by an upper body member 58 which is removably attached to the main body section 40 by means of screws 59. The threaded member 57 is threaded into a threaded bore 60 which is in axial alignment with the bores 41, 42 and the stem 50. The threaded member 57 can be manipulated by a knurled extension 61 in order to selectively locate the axial position of the threaded member with respect to the upper end of the stem 50. A cap nut 62 is provided with an axial opening for freely receiving the knurled member 61 and is removably threaded onto the upper extension 63 of the body section 58.

The threaded member 57 is adjusted axially to the desired position affording the proper time delay gap between its bottom end which is abutted by the upper end of the stem 50 under the influence of a fluid signal directed to the bellows 47, the proper adjustment may be fixed by means of a stop 64 radially disposed in the upper section of the body 58 and removably carried therein. This stop member 64 may be spring loaded by means of a coil spring 65 and a back-up screw 66 operating in the bore 67.

The lower end of the threaded member 57 is formed with a shallow depression 68 to receive the upper end of the stem 50 and is contacted to limit the upward movement of the bellows under the fluid signal pressure therein and any pre-selected axial adjustment of the threaded member 57.

It will be seen that upon release of the signal pressure supplied to the bellows, the weight of the head 49 is sufficient to allow the bellows to approach a collapsed position and to thus effect a time delay in the downward movement of the stem as it intersects the path of the fluid jet between the input and output tubes. As the stem is removed from the path of the main jet stream across 54 and 55, the output at 56 is re-established.

This invention used either as a fluid relay or as a time delay device as, for example, in the selection and control of fluidic circuits to actuate supplemental circuits and responsive devices and is now Pat. No. 3,447,220 has proven very effective and efficient in operation, and due to the extreme simplicity of construction involved, and its relative diminutive size, and flexibility, can be produced at very low cost.

We claim:

1. A fluidic relay comprising a chamber formed therein and vented to atmosphere, axially aligned fluid inlet and outlet tubes in the housing projecting into said chamber and spaced apart at their adjacent ends within the chamber to provide a passage and gap along which a relatively higher pressure fluid jet stream may be directed in a direct linear path from the inlet tube to the outlet tube in said chamber, and jet stream interrupter means movable laterally across the said jet stream linear path in response to a relatively lower fluid pressure signal effective to block said linear jet stream in its path to the aligned outlet tube.

2. A fluidic relay comprising a housing having a hollow vented chamber formed therein, axially aligned fluid inlet and outlet tubes in the housing projecting into the chamber and spaced apart at their adjacent ends within the chamber to provide a gap across which a relatively higher pressure fluid jet stream may be directed from the inlet to the outlet tubes in said chamber, and jet stream interrupter means responsive to a relatively lower fluid pressure signal to block said jet stream, said last named means including an expansion chamber and a member movable thereby into and out of the path of said jet stream, and means for limiting the movement of the member in one direction.

3. A time delay fluidic relay comprising a housing having a hollow vented chamber formed therein, a working fluid inlet conduit, an outlet conduit, said conduits being axially aligned and spaced at their adjacent ends to form a gap for passage of a stream thereacross, a stream interrupter in the housing having movement across the path of said stream to block the same in response to a relatively lower fluid pressure signal directed against said interrupter, and adjustable means for selecting the extent of movement of the interrupter to and through the path of said stream so that upon termination of said lower pressure signal said interrupter will reverse its movement by gravity out of the path of the stream and thereby establish said working stream between the inlet and outlet conduits.

4. The invention as defined in claim 3 in which said adjustable means is in axial alignment with said interrupter, and means for locking the said adjustable means in a selected adjustment.

5. A fluidic relay comprising a housing having a hollow vented chamber formed therein and vented to atmosphere, axially aligned fluid inlet and outlet tubes in the housing projecting into said chamber and spaced apart at their adjacent ends within the chamber to provide a passage and gap along which a relatively higher pressure fluid jet stream may be directed in a direct linear path from the inlet tube to the outlet tube in said chamber, and jet stream interrupter means movable into and across the said jet stream linear path in response to a relatively lower fluid pressure signal effective to block said linear jet stream, said last named means including an expansion chamber and a member movable thereby laterally into and out of the path of said jet stream.

6. The invention defined in claim 5 in which the movable member of said interrupter means is flexed about a fulcrum.

7. The invention of claim 5 in which the chamber is vented to atmosphere and the expansion chamber comprises a bellows expandable axially in response to a relatively low fluid pressure signal directed thereinto.

8. The invention as defined in claim 5 in which an adjustable means is carried in said housing for limiting the extent of movement of the member in one direction to block said jet stream under the influence of said fluid signal and to thereby select the time delay of the return of said member from its limit of travel in said one direction to a position out of the path of said jet stream flow.

9. A fluidic relay comprising a housing having a hollow vented chamber formed therein, a plurality of respectively axially aligned fluid inlet and outlet tubes in the housing projecting into said chamber and spaced apart at their respective adjacent ends within the chamber to provide gaps across and along which relatively higher pressure fluid jet streams may be directed respectively from the respective inlet to the respective outlet tube in said chamber, and jet stream interrupter means movable alternatively into and out of the paths of said jet streams in response to a selected relatively lower fluid pressure signal to alternately block and establish said jet streams.

10. The invention defined in claim 9 in which said respective inlet and outlet tubes are arranged in laterally spaced apart pairs.

11. The invention of claim 10 in which said interrupter means, in response to a relatively low fluid pressure signal functions to block a relatively high fluid pressure stream flowing in a path between certain respective aligned inlet and outlet tubes and substantially simultaneously establishing a path of flow between certain other of the respective aligned inlet and outlet tubes.

References Cited

UNITED STATES PATENTS

| | | |
|---|---|---|
| 1,959,889 | 5/1934 | Wunsch. |
| 2,408,603 | 10/1946 | Braithwaite et al. |
| 2,532,847 | 12/1950 | Junkin _____ 251—60 |
| 3,131,601 | 5/1964 | Curran. |
| 3,175,569 | 3/1965 | Somers _____ 137—815 |
| 3,223,103 | 12/1965 | Trinkler. |
| 3,275,014 | 9/1966 | Plasko _____ 137—815 |
| 3,276,463 | 10/1966 | Bowles _____ 137—815 |
| 3,318,329 | 5/1967 | Norwood _____ 235—201 XR |

SAMUEL SCOTT, Primary Examiner

U.S. Cl. X.R.

137—81.5

PO-1050
(5/69)

UNITED STATES PATENT OFFICE
CERTIFICATE OF CORRECTION

Patent No. __3,516,439__ Dated __August 4, 1970__

Inventor(s) __Morris R. Hicks and Joseph C. LeVeque__

It is certified that error appears in the above-identified patent and that said Letters Patent are hereby corrected as shown below:

Column 2 line 60 after "interrupted" insert --or blocked--;

Column 3 line 54 delete "15", first occurrence, insert -- 15' --

Column 3 line 56 after "from" insert --input--;

Column 3 line 57 delete "input 15" insert --output 15'--;

Column 4 line 34 delete "554" insert --54--;

Column 4 line 72 delete "is contacted";

Column 5 line 12 delete "and is now Pat. No. 3,447,220".

SIGNED AND
SEALED
NOV 3 1970

(SEAL)
Attest:

Edward M. Fletcher, Jr.
Attesting Officer

WILLIAM E. SCHUYLER, JR.
Commissioner of Patents